G. W. SCRIBNER.

Reed-Organ.

No. 8,771. Reissued June 24, 1879.

Attest:

A. Barthel

Charles J. Hunt

Inventor:

Geo. W. Scribner

By Atty

Thos. S. Sprague

N. PETERS, PHOTO-LITHOGRAPHER, WASHINGTON, D. C.

UNITED STATES PATENT OFFICE.

GEORGE W. SCRIBNER, OF CHATHAM, ONTARIO, CANADA.

IMPROVEMENT IN REED-ORGANS.

Specification forming part of Letters Patent No. 104,653, dated June 21, 1870; Reissue No. 8,771, dated June 24, 1879; application filed October 9, 1878.

*To all whom it may concern:*

Be it known that I, GEORGE W. SCRIBNER, formerly of Detroit, Michigan, and now of Chatham, in the county of Kent and Dominion of Canada, have invented an Improvement in Reed-Organs, of which the following is a specification.

The nature of my invention relates to the construction and application of a series of qualifying-tubes to the reeds of musical instruments, in which the tone is produced by the suction of air through metallic reeds, for the purpose of qualifying and softening the metallic tone of the reeds and rendering it similar to that produced in pipe-organs.

The invention consists in the peculiar construction of a series of tubes or pipes, of wood or metal, in a bank or battery, so that the partition-wall will form the sides of two of the adjoining tubes, the smaller ends of which inclose one or more reeds, while the larger ends are closed, each tube being provided on the upper side, near the rear end, with an opening, through which the air, subsequently passing through the reeds, enters, and through which the sound produced by the vibration of the reeds escapes, substantially as more fully hereinafter described.

Figure 1:
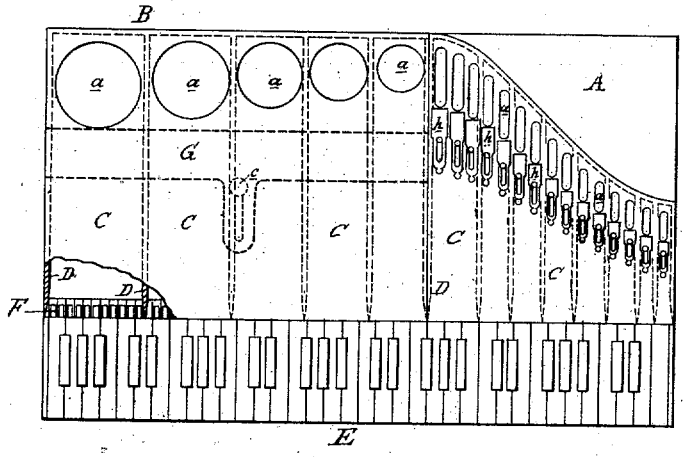
Figure 2:
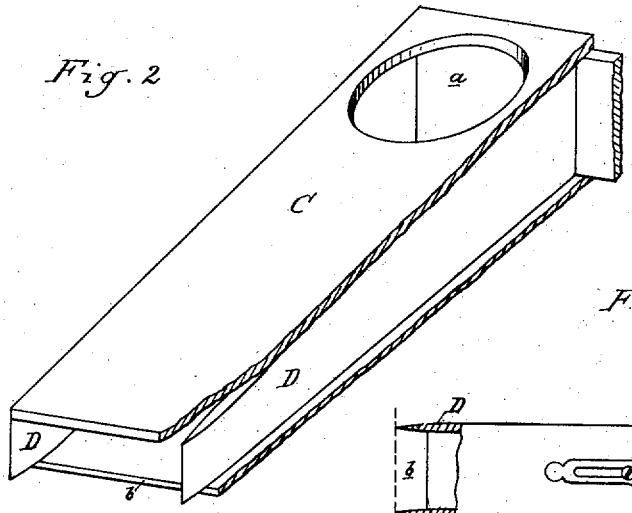
Figure 3:
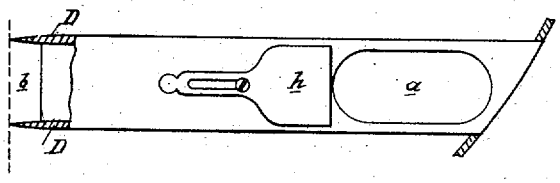

In the drawings, Figure 1 is a plan of my improvement, showing the same lying on the wind-chest behind the reeds and key-board. Fig. 2 is a perspective of one of my qualifying-tubes. Fig. 3 is a plan of the same with a tuning-slide attached.

In the drawings which form a part of this specification, A represents the top of the wind-chest or sounding-board of a reed-organ, upon which is placed a case, B, subdivided into compartments C, of varying sizes, by means of the division-strips D; and E represents the key-board of a five-octave reed-organ, and F the reeds thereof, said key-board and reeds being of the ordinary construction employed in organs using an exhaust-bellows.

The reeds forming the bass registers require more air to produce the proper volume of tone than those of the middle registers, and the latter more air than is required by the upper or treble registers; consequently the compartments C are made for the lower bass register the largest, and they gradually diminish in size for the succeeding registers up the scale in proportion to the lesser amount of air required for the perfect action of the reeds in the higher registers, as shown in Fig. 1.

The air is admitted through the openings *a* at the rear upper side of the compartments, and, by the action of the exhaust-bellows usually employed, is drawn through the reeds, the front lower edge being slightly cut away, as at *b*, Fig. 2, to allow the battery of compartments to be placed closely over the reeds to the exclusion of air, except such as may be drawn through the openings *a*. The sound emitted by the speaking-reeds finds its only outlet through said openings *a*, and in its passage from the reed to said opening through the compartment its quality is so altered that it very closely resembles the tones produced by a pipe-organ, its reedy twang being dissipated by its resonance in the passage through the tube.

The compartments of the bass and middle registers are preferably made of uniform length, while those of the treble register may be gradually diminished in length as they ascend the scale.

In practice it is found that should a pipe or tube be provided for each reed, the room required for such would exceed the space found in a cabinet or reed organ, and would require it to approximate the size of a pipe-organ with a like number of registers. To avoid this objection is the spirit of my invention in constructing resonant chambers or compartments in bank or battery, as shown, adapting the size of each compartment to the amount of air necessary to the successful operation of the reeds over which it is placed.

If desired, the tubes of the bass register may be provided with a slide, G, operated by any suitable stop, for the purpose of diminishing the volume of sound, at will, through the openings *a*, said slide acting as a valve arranged on top of the case, and made adjustable by means of the set-screw *c*, as shown.

The tubes of the treble register may be, if desired, provided with adjustable slides *h*, for a like purpose as that for which the valve G is employed, and may be found useful in tuning the tubes in unison with the reed to give the tone a flute-like quality, so much admired in pipe-organs.

If it be desired to construct a reed-organ having the appearance of a pipe-organ, the reed-board and qualifying-tubes may be placed vertically in the instrument in the relative positions described, with the advantage of having the sound emitted from the tubes thrown forward into the apartment instead of upward.

This improvement can be easily applied to any reed-organ already built at a trifling expense.

I am aware that an exhaust reed-organ has before been provided with resonant tubes, one for each reed; and I am also aware that slides or valves have been used on organ-pipes to qualify the sound; but I do not claim either of these features, broadly.

What I claim as my invention is—

1. In combination with a reed-organ having an exhaust-bellows, a bank or battery of qualifying tubes or compartments, each of said compartments in the main portion of the bank or battery inclosing a number of reeds, and being of the size to admit the amount of air necessary to the successful operation of the reeds over which it is placed, substantially as described.

2. In a reed-organ with exhaust-bellows, a bank or battery of qualifying tubes or compartments, of varying sizes, inclosed in a box having parallel ends, said compartments being separated by parallel division-strips and inclosing each a number of reeds, substantially as described and shown.

3. The combination, with the key-board and reeds of an exhaust reed-organ, of a bank or battery of qualifying-compartments, each of which incloses more than one reed, and has an opening in its top (or front side) at the end opposite the reeds, through which all the air supplied to the reeds is drawn, and out of which the sound-vibrations issue, substantially as described and shown.

4. The combination, with an exhaust reed-organ, of the tubes or compartments C, each provided with two or more metallic reeds, F, with mouths or openings *a*, and with qualifying or tuning valves or slides G H, constructed and arranged substantially as described and shown, and for the purposes specified.

5. The reed-organ above described and shown, consisting of the chest A, tubes C, each inclosing two or more reeds, and provided with mouths *a*, and tuning-slides G H, and key-board E, and suitable exhaust-bellows, when the several parts are constructed and arranged as and for the purpose set forth.

GEORGE W. SCRIBNER.

Witnesses:
H. S. SPRAGUE,
J. A. WARREN.